United States Patent Office 3,685,951
Patented Aug. 22, 1972

3,685,951
INCREASING DYESTUFF AFFINITY OF NATURAL POLYAMIDES BY ADDING WATER-SOLUBLE POLYAMIDES TO AQUEOUS BATH
Ergun Tamer, Bergisch Neukirchen, Udo Hendricks, Cologne, and Mathieu Quaedvlieg, Opladen, Germany (all c/o Farbenfabriken Bayer Aktiengesellschaft, Leverkusen, Germany)
No Drawing. Filed Feb. 16, 1970, Ser. No. 11,918
Claims priority, application Germany, Feb. 27, 1969, P 19 09 963.9
Int. Cl. D06p 1/36
U.S. Cl. 8—31                                   6 Claims

ABSTRACT OF THE DISCLOSURE

Process for increasing the dyestuff affinity of fibre materials of natural polyamides consisting in treating the fibre materials with an aqueous bath containing water-soluble polyamides which have been obtained by reacting aliphatic polyamines of the formula

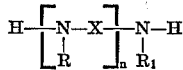

in which R and $R_1$, independently of one another, stand for hydrogen, a $C_1$–$C_5$-alkyl group or a hydroxyalkyl group with 1–3 carbon atoms; X denotes a bivalent, optionally substituted aliphatic radical with 1–6 carbon atoms; and $n$ stands for an integer from 1 to 4, with $\alpha,\beta$-unsaturated aliphatic monocarboxylic acids, or with aliphatic polycarboxylic acids which may contain hetero atoms, or with their functional derivatives capable of forming amides.

---

The present invention relates to a process for increasing the dyestuff affinity of fibre materials of natural polyamides; more particularly it concerns a process for increasing the dyestuff affinity of fibre materials of natural polyamides wherein the fibre materials, prior to dyeing, are treated with aqueous baths containing water-soluble polyamides which have been obtained by reacting aliphatic polyamines of the formula

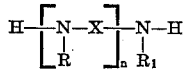

(I)

wherein

R and $R_1$, independently of one another, stand for hydrogen, a $C_1$–$C_5$-alkyl group or a hydroxyalkyl group with 1–3 carbon atoms;
X denotes a bivalent, optionally substituted aliphatic radical with 1–6 carbon atoms; and
$n$ stands for an integer from 1 to 4, with $\alpha,\beta$-unsaturated aliphatic monocarboxylic acids or with aliphatic polycarboxylic acids which may contain hetero atoms, or with their functionally derivatives capable of forming amides, for example, with the halides, amides, anhydrides or esters.

Amines of the general Formula I which are suitable for preparing the water-soluble polyamides to be used according to the invention are, for example, ethylene-diamine, diethylene-triamine, triethylene-tetramine, tetraethylenepentamine, bis-(3-aminopropyl)-amine, tripropylene-tetramine, N-(2-hydroxyethyl)-ethylene-diamine, hexamethylene-diamine, N,N'-dimethylethylene-diamine, and especially polyamines containing tertiary amino groups such as bis-(3-aminopropyl)-methylene.

Examples of $\alpha,\beta$-unsaturated carboxylic acids are acrylic acid and methacrylic acid, and examples of aliphatic polycarboxylic acids possibly containing hetero atoms are succinic acid, adipic acid, maleic acid and diglycollic acid.

The water-soluble polyamides to be used according to the invention are known. They can be obtained, for example, by reacting amines of Formula I with $\alpha,\beta$-unsaturated carboxylic acids or with aliphatic polycarboxylic acids possibly containing hetero atoms, or with their functional derivatives capable of amide formation, at temperatures above 40° C., optionally under reduced pressure.

The most advantageous proportions between the amines of the Formula I, on the one hand, and the $\alpha,\beta$-unsaturated carboxylic acids or the aliphatic polycarboxylic acids possibly containing hetero atoms or their functional derivatives capable of amide formation, on the other hand, can easily be established by preliminary experiments. It has proved particularly expedient to use the amines and carboxylic acids in such a proportion that 0.5–3, preferably 0.75 to 1.5, primary and/or secondary amino groups are present for every double bond and every carboxyl group or functional derivative thereof.

The water-soluble polyamides to be used according to the invention advantageously have an average molecular weight of 400–2000. Polyamides which still contain free primary or secondary amino groups can be adjusted, before being used, to a pH value of 4–7, expediently by means of lower aliphatic carboxylic acids, such as formic acid, acetic acid or glycollic acid.

The amounts in which the compounds to be used according to the invention are added to the pretreatment baths, may vary within wide limits. In general, an addition of 0.25–2, preferably 0.75–1.5, percent by weight, calculated on the weight of the fibre materials, has proved satisfactory.

The pretreatment of the fibre materials is expediently carried out by introducing the material into an aqueous liquor which has been heated to about 40° C. and contains the water-soluble polyamides to be used according to the invention and which has a pH value of about 7, subsequently raising the temperature of the bath to 80–100° C. in the course of about 30 minutes, and keeping the bath at this temperature for 15–30 minutes. The temperature of the bath is then gradually lowered to about 50° C. by the addition of cold water. After briefly rinsing with cold water, the material is drained and dried.

Natural polyamides the dyestuff affinity of which is increased by the process according to the invention, are for example, silk and, in particular, wool. They may be present in any state of processing, for example, as loose material, combed material, rovers, yarn or piece goods.

The dyestuff affinity of these fibre materials is increased with regard to all dyestuffs, conventionally used for the dyeing and printing of natural polyamides. These are, in particular, anionic dyestuffs. These anionic dyestuffs may belong to a great variety of dyestuff classes, e.g. the azo, anthraquinone or triphenyl-methane dyestuffs; the dyestuffs may also contain groups capable of reacting with NH-groups of the fibre material. The azo dyestuffs may be metal-free as well as metallisable or metal-containing mono- or polyazo dyestuffs.

The process according to the invention is of particular importance for producing differences in the depth of colour when dyeing fibre materials of natural polyamides. If fibre materials which have been pretreated according to the invention are dyed in a continuous or discontinuous process together with untreated polyamide fibre materials, then the pretreated fibre material exhibits a substantially deeper shade than the non-pretreated fibre material. If the fibre materials which have been pretreated according to the invention are dyed together with non-pretreated fibre materials part of which was previously dyed fast to crossdyeing, then extraordinarily contrasty multicolour dyeings are obtained.

Furthermore, the dyestuff affinity of the treated fibre materials is increased by the process according to the invention to such an extent that the fibres are dyed already below boiling temperature, e.g. at 80° C., with the same depth of colour which is achieved on untreated fibre material only at 100° C. Moreover, a more level dyeing can be achieved with the aid of the process according to the invention on wool tending to become tippy-dyed.

The structures of the dyestuffs designated by numbers I–III are listed in the table found at the end of the examples.

EXAMPLE 1

Loose wool is treated in a packing apparatus in a liquor ratio of 1:15 with a liquor containing, per litre, 0.66 g. of the 1:1 condensation product of bis-(3-amino-propyl)-methylamine and acrylic acid methyl ester described below. The bath is heated from 40 to 100° C. within 30 minutes and subsequently kept at this temperature for 15 minutes. After briefly rinsing, the wool is drained and dried.

The carpet yarn produced from this pretreated wool is worked together with non-pretreated carpet yarn into a carpet. This carpet is dyed in the usual way by introducing it at room temperature in a liquor ratio of 1:40 into a dyebath containing, per litre, 0.25 g. of the dyestuff 1-aminobenzene-sulphonic acid→1-[2′,3′-dichloro-quinoxaline-(6)-carbonyl]-amino-8 - hydroxy-3,6-disulphonic acid, 0.5 g. of glacial acetic acid, 0.25 g. of the reaction product of 1 mol stearylamine and 30 mol ethylene oxide, 0.125 g. of the reaction product of 1 mol stearylamine and 10 mol ethylene oxide, and 2.5 g. of calcined sodium sulphate, and heating the bath to 100° C. within 60 minutes. The dyeing process is terminated after dyeing for 30 minutes at boiling temperature. A carpet dyed in contrasty light-red/dark-red shades is obtained, as the pretreated yarn exhibits a substantially darker red shade than the non-pretreated yarn.

The 1:1 condensation product used for the pretreatment was prepared as follows:

290 parts by weight bis-(3-amino-propyl)-methylamine were mixed at 40–50° C. with 172 parts by weight acrylic acid methyl ester and the mixture was subsequently heated in a vacuum of 12 mm. Hg first at 90–100° C. for 2 hours and then at 150–160° C. for 1 hour. A highly viscous substance was obtained which gave a clear solution in water and had an average molecular weight of 2400.

An equivalent increase of the dyestuff affinity was achieved when instead of the described 1:1-condensation product the same amount of the 1:2-condensation product of bis-(3-amino-propyl)-methylamine and acrylic acid methyl ester described below was used.

This 1:2 condensation product was prepared as follows:

290 parts by weight triethylene-tetramine were mixed at 40–50° C. with 344 parts by weight acrylic acid methyl ester. The mixture was stirred at 80–90° C. for one hour and subsequently heated for 1.5 hours in a water jet vacuum at 150–160° C. The water-soluble condensation product had an average molecular weight of 700.

EXAMPLE 2

Woollen knitting yarn is treated in a yarn dyeing apparatus in a liquor ratio of 1:30 with a liquor containing, per litre, 0.33 g. of the 1:1 condensation product of triethylene-tetramine and acrylic acid methyl ester described below. The bath is heated from 40 to 100° C. within 30 minutes and subsequently kept at this temperature for 15 minutes. After briefly rinsing, the yarn is drained and dried.

The yarn pretreated in this way is knitted together with non-pretreated woollen yarn. The knitted piece is dyed in the usual way by introducing it at room temperature in a liquor ratio of 1:25 into a dyebath containing, per litre, 0.3 g. of the dyestuff I, and
0.8 g. of glacial acetic acid, and heating the bath to 100° C. within 60 minutes. After dyeing at boiling temperature for 30 minutes, the dyeing process is terminated. A very contrasty light-scarlet/dark-scarlet dyeing is obtained, as the pretreated yarn exhibits a substantially darker scarlet shade than the non-pretreated yarn.

The 1:1 condensation product used for the pretreatment was prepared as follows:

292 parts by weight triethylene-tetramine were mixed at 40–50° C. with 172 parts by weight acrylic acid methyl ester and the mixture was subsequently heated at 150–160° C. in a water jet vacuum for 3 hours. A water-soluble condensation product with an average molecular weight of 500 was obtained.

An equivalent increase of the dyestuff affinity was achieved when instead of the described 1:1-condensation product the same amount of one of the 1:2-condensation products described below was used.

1:2 condensation product of triethylene-tetramine and acrylic acid methyl ester. It was prepared as follows:

175 parts by weight of triethylene-tetramine were mixed at 40–50° C. with 206 parts by weight of acrylic acid methyl ester. The mixture was stirred for 1 hour at 80–90° C. and subsequently heated for 75 minutes in a water jet vacuum at 150–155° C. There was obtained a water-soluble condensation product of an average molecular weight of 1500.

1:2-condensation product of diethylene-tetramine and acrylic acid methyl ester. It was prepared as follows:

103 parts by weight of diethylene-triamine were mixed at 40–50° C. with 172 parts by weight of acrylic acid methyl ester. The mixture was subsequently heated for 2 hours in a water jet vacuum at 150–160° C. There was obtained a water-soluble condensation product of an average molecular weight of 1100.

EXAMPLE 3

The procedure described in Example 2 is followed, but the pretreatment bath contains, per litre, instead of the product there described, 0.33 g. of the 1:1 condensation product of ethylene-diamine and acrylic acid methyl ester described below.

This 1:1 condensation product was prepared as follows:

240 parts by weight ethylene-diamine were mixed at 50–60° C. with 344 parts by weight acrylic acid methyl ester and the mixture was stirred at the same temperature for 1 hour. It was subsequently heated in a water jet vacuum at 150–160° C. for 3 hours. A reddish water-soluble condensation product with an average molecular weight of 1000 was obtained.

When a yarn mixture consisting of the pretreated yarn and of non-pretreated yarn is dyed, a contrasty light/dark dyeing is obtained.

When instead of 1:1-condensation product there was used the same amount of a 1:2-condensation product of pentaethylene-hexamine and methacrylic acid methyl ester there was achieved an equivalent increase of the dyestuff affinity.

The 1:2-condensation product was prepared as follows:

116 parts by weight of pentaethylene-hexamine were mixed with 100 parts by weight of methacrylic acid methyl ester. The mixture was stirred for 1 hour at 80–90° C. and was subsequently heated for 1.5 hours in a water jet vacuum at 140–150° C. There was obtained a water-soluble condensation product of an average molecular weight of 630.

EXAMPLE 4

Loose wool is treated in a packing apparatus in a liquor ratio of 1:15 with a liquor containing, per litre, 0.66 g. of the 1:1 condensation product of N-(aminoethyl)-ethanolamine and acrylic acid described below. The bath is heated from 40 to 100° C. within 30 minutes and subsequently kept at this temperature for 15 minutes. After briefly rinsing, the material is drained and dried.

The pretreated wool is spun together with non-pretreated wool. A carpet produced from this yarn is dyed in the usual way with the 1:2 chromium complex of the monoazo dyestuff anthranilic acid→1-phenyl-3-methylpyrazolone (4 g. of dyestuff/litre of padding liquor; liquor absorption 300%), and subsequently steamed at about 100° C. with saturated steam for 10 minutes. A very contrasty pale-yellow/dark-yellow dyeing is obtained, as the pretreated yarn exhibits a substantially darker yellow shade than the non-pretreated yarn.

The 1:1 condensation product used for the pretreatment was prepared as follows:

208 parts by weight N-(2-hydroxyethyl)-ethylene-diamine were mixed at 50–60° C. with 144 parts by weight acrylic acid. The reaction mixture was stirred at the same temperature for 3 hours, then heated at 140° C. for 2 hours and at 170–180° C. for 4 hours, and subsequently kept at the same temperature under a vacuum of 12 mm. Hg for 1½ hours. A greenish-brown viscous substance was obtained which had an average molecular weight of 400.

EXAMPLE 5

Woollen knitting yarn is treated in a yarn dyeing apparatus in a liquor ratio of 1:30 with a liquor containing, per litre, 0.33 g. of the 1:1 condensation product of diethylene-triamine and succinic acid dimethyl ester described below. The bath is heated from 40 to 100° C. within 30 minutes and subsequently kept at this temperature for 15 minutes. After briefly rinsing, the yarn is drained and dried.

This yarn is knitted together with non-pretreated yarn and a navy-coloured yarn (dyed with 1.33 g. of the dyestuff II per litre, liquor ratio 1:30, and chromed in the usual way). This knitted piece is dyed as described in Example 2. A contrasty tricolour dyeing is obtained (light-scarlet/dark-scarlet/navy).

The 1:1 condensation product used for the pretreatment was prepared as follows:

103 parts by weight diethylene-triamine 146 parts by weight succinic acid dimethyl ester and 0.5 part by weight potassium hydroxide were heated at 150–160° C. for 1 hour, the pressure was subsequently decreased to about 15 mm. Hg and the mixture kept at the same temperature for another hour. A water-soluble condensation product with an average molecular weight of 500 was obtained.

EXAMPLE 6

Loose wool is treated in a packing apparatus in a liquor ratio of 1:15 with a liquor containing, per litre, 1 g. of the 1:1 condensation product described below. The bath is heated from 40 to 80° C. within 30 minutes and subsequently kept at this temperature for 30 minutes. After briefly rinsing, the material is drained and dried.

After twisting with non-pretreated woollen yarn, this yarn is dyed as described in Example 2 with the chroming dyestuff III and subsequently chromed in the usual way. A contrasty light-blue/dark-blue dyeing is obtained, as the pretreated yarn exhibits a substantially darker blue shade than the non-pretreated yarn.

The 1:1 condensation product used for the pretreatment was prepared as follows:

206 parts by weight diethylene-triamine were mixed at 40–50° C. with 142 parts by weight acrylic acid amide. The reaction mixture was stirred at the same temperature for 1 hour and, after the addition of 3.5 parts by weight potassium hydroxide, heated at 190–200° C. for 3 hours and subsequently under a vacuum of 12 mm. Hg at 190–200° C. for 2 hours. A greenish, highly viscous liquid with an average molecular weight of 350 was obtained.

Structures of dyestuff I–III used in the examples

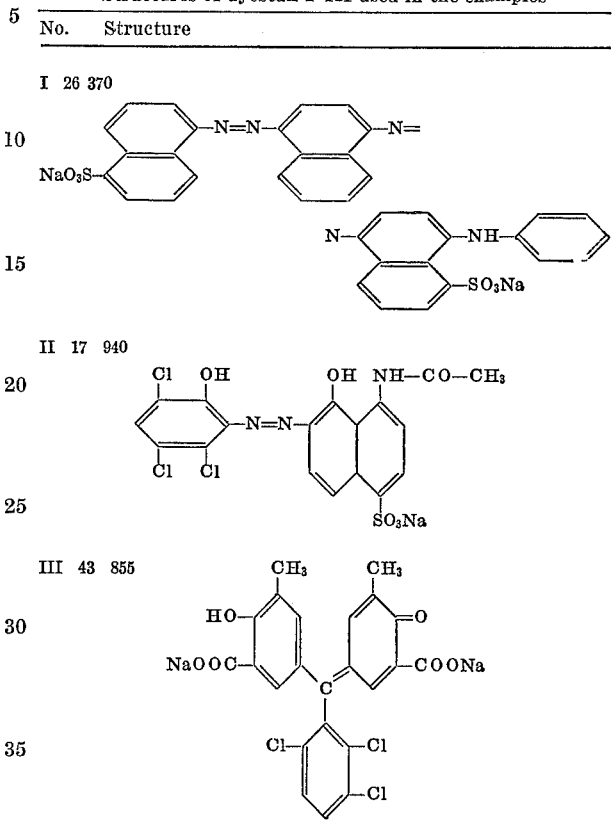

| No. | Structure |
|-----|-----------|
| I   | 26 370    |
| II  | 17 940    |
| III | 43 855    |

What is claimed is:

1. Process for increasing the dyestuff affinity of fiber materials of natural polyamides, which comprises adding the fiber materials prior to dyeing to an aqueous bath containing water-soluble polyamides having a molecular weight under about 2,400 which have been obtained by reacting aliphatic polyamines of the formula

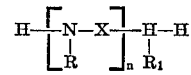

in which
R and $R_1$, independently of one another, stand for hydrogen, a $C_1$–$C_5$-alkyl group or a hydroxy-alkyl group with 1–3 carbon atoms;
X denotes a member of the class consisting of a bivalent, aliphatic radical with 1–6 carbon atoms and said radical containing substituents; and
n stands for an integer from 1 to 4,
with α,β-alkenyl monocarboxylic acids, or with aliphatic dicarboxylic acids or aliphatic dicarboxylic acids containing —O— atoms, or with the functional derivatives of said acids selected from the group consisting of their halides, amides, anhydrides, and esters and said fibers are subsequently removed from the bath and drained.

2. Process according to claim 1 wherein the water-soluble polyamides have been prepared from the said aliphatic polyamines and the said acids or their said functional derivatives used in such a proportion that 0.5 to 3 primary and/or secondary amino groups are present for every double bond and every carboxyl group or functional derivative in the component reacted with said polyamine.

3. Process according to claim 1 wherein the water-soluble polyamides have been prepared from the said aliphatic polyamines and the said acids or their said functional derivatives used in such a proportion that 0.75 to 1.5 primary and/or secondary amino groups are present for every double bond and every carboxyl group or functional derivative in the component reacted with the said polyamine.

4. Process according to claim 1 wherein the aliphatic polyamines contain tertiary amino groups.

5. Process according to claim 1 wherein the aliphatic polyamine is bis-(3-amino-propyl)-methylamine.

6. Fibre materials of natural polyamines treated according to the process of claim 1.

References Cited
UNITED STATES PATENTS 3,078,139   2/1963   Miller et al. _____ 8—128

GEORGE F. LESMES, Primary Examiner

P. C. IVES, Assistant Examiner

U.S. Cl. X.R.

8—100, 21 R; 260—557